United States Patent Office 3,514,039
Patented May 26, 1970

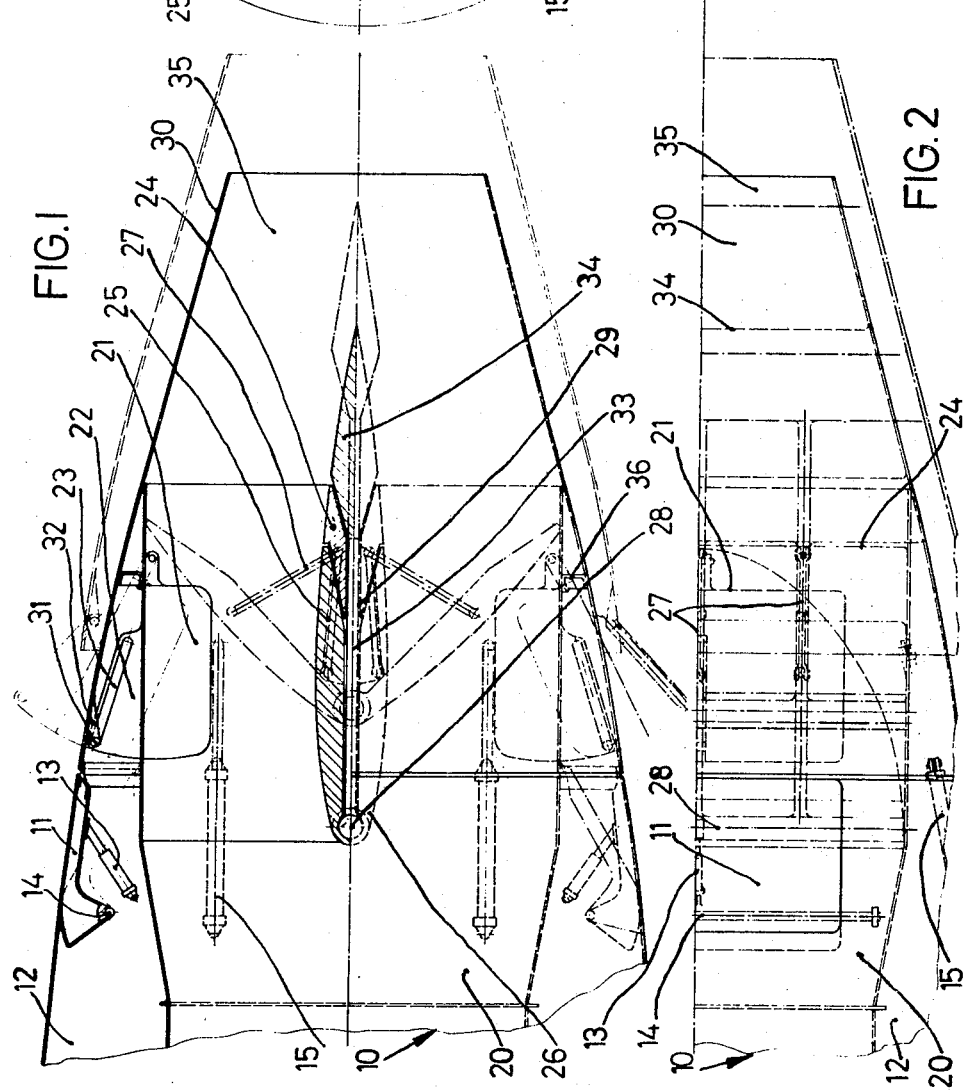

3,514,039
JET FLOW CONTROL APPARATUS FOR AN AIRCRAFT
Gerhard Kopp, Munich, Germany, assignor to Entwicklungsring Sud G.m.b.H., Munich, Germany
Filed Nov. 29, 1967, Ser. No. 686,543
Claims priority, application Germany, Dec. 20, 1966, E 33,066
Int. Cl. B64c *15/06*
U.S. Cl. 239—265.31      5 Claims

ABSTRACT OF THE DISCLOSURE

The invention concerns an apparatus for reducing the flow of jet gases through the exhaust nozzle of an aircraft. Corresponding to axial movement of the nozzle away from the exhaust pipe of the aircraft, deflection flaps mounted within the exhaust pipe are caused to move to a position so as to obstruct the gas flow therethrough. Additionally, guide flaps located about the terminal periphery of the exhaust pipe are caused to simultaneously move outwardly away from the surface of the nacelle of the aircraft allowing a portion of the exhaust gases to bypass the exhaust nozle and thus serving to reduce the jet gas pressure within the exhaust pipe and produce a decelerating thrust. The apparatus provides a smooth and efficient means for gradually reducing the flow of the jet exhaust stream during deceleration.

BACKGROUND OF THE INVENTION

This invention generally relates to a jet stream deflection apparatus positioned within a jet exhaust pipe and more particularly relates to a flap apparatus adapted for positioning within the exhaust pipe of a rapid take-off aircraft wherein a plurality of flaps are movable with respect to a common axis in response to axial movement of the exhaust nozzle of the aircraft.

The jet engines of an aircraft usually include an exhaust nozzle having means for deflecting the exhaust jet from its normal flow direction so as to facilitate adjustment of the flight path of the aircraft as well as the magnitude of the exhaust jet. Such nozzles generally include one or more wall portions positioned at the exhaust orifice of the exhaust pipe or intermediate thereto. The wall portions display curved surfaces for deflecting the normal flow stream of the exhaust jet, but do not generally include means for completely obstructing the flow path of the exhaust jet.

Other known exhaust systems include two concave shell-shaped flaps, each of which is capable of being collapsed in a direction counter to the flow path of the exhaust jet. Such systems usually require separate control means for the operation of the flaps, as well as for operation of guide vanes cooperating therewith. Further, means are often included for synchronizing the movement of the flaps with those of the guide vanes.

The illustrated embodiment includes means for positioning a plurality of guide flaps cooperatively connected to the exhaust nozzle of a jet aircraft as determined by the axial position of the nozzle. A particular feature of the illustrated embodiment is that the actuating devices for accomplishing this positioning are located exterior to the flow path of the hot exhaust jet. Additionally, the movement of the flaps is synchronized with that of the nozzle without the necessity of including a large number of structural components. A guide is provided for directing the movement of the guide flaps relative to the deflecting flaps along a predetermined path. In this manner, a symmetrical exhaust gas flow is maintained during initiation of the deceleration phase of the aircraft and during movement of the guide flaps into their corresponding decelerating positions so that the transition from cruise flight can be accomplished in a smooth and efficient manner. The deflection flaps of the illustrated embodiment are rotatable about a common axis. This preferred rotational movement is accomplished by means of a shaft which is connected to an actuating rod which can be shifted in an axial direction with respect to the exhaust pipe. The path of movement of the actuating rod is determined by a rib which is rigidly secured to the exhaust pipe. In accordance with the illustrated embodiment, the deflection flaps and cooperating rib are shaped in a manner to provide improved aerodynamic flow conditions. As will hereinafter be more clearly described, by means of this arrangement those components necessary for providing the desired deceleration of the aircraft can be actuated with a minimum amount of energy consumption.

A main object of this invention is to provide a simple and improved jet deflection apparatus for an aircraft. Other objects and advantages of this invention will become apparent with reference to the following description and accompanying drawings which show an illustrative embodiment of this invention.

BRIEF DECRIPTION OF THE DRAWINGS

FIG. 1 is a sectional view of an exhaust pipe of a jet aircraft engine and nozzle therefor embodying certain features of this invention.

FIG. 2 is the lower half of a half-sectional view of the apparatus illustrated in FIG. 1.

FIG. 3 is a fragmentary end view of the device illustrated in FIG. 1.

DESCRIPTION OF THE PREFERRED EMBODIMENT

Referring in particular to FIG. 1, a jet engine 10 is provided which is encased within a nacelle 12 of a jet aircraft. Mounted rigidly withn the nacelle 12 is an exhaust pipe 20 and a jet flow deflection direction nozzle 30 movable axially with respect to the pipe 20. End segments 11 are movably hinged to the nacelle 12 for rotation about an axis 14. Serving to cause rotation of the segments 11 about the axis 14 is an actuating device 13.

Positioned within the nacelle 12 and secured to the walls thereof is a second piston actuating means 15 which is selectably variable in length with one end thereof connected to the nozzle 30. Upon actuation of the actuating means 15 the nozzle 30 is axially shifted with respect to the nacelle 12. Serving to maintain alignment of the axis of the nozzle 30 with respect to the axis of the exhaust pipe 20 during axial movement thereof are a plurality of guide rollers 36.

Equally spaced about the circumferential surface of the exhaust pipe 20 are a plurality of guide flaps 21. Fixed to each guide flap is a mounting support 22 which comprises an arm 32 defining a guide channel 23 therein. Secured to the end of the nozzle 30 is a projecting guide member 31 maintained within the channel 23 for slidable movement therein. Outward axial movement of the nozzle 30 produces a corresponding movement of the guide member 31 within the channel 23 thereby shifting the guide flaps 21 to their phantom position. The guide flaps 21 and the end segments 11 serve to define the exhaust passage for the deflected exhaust jet.

Mounted within the exhaust pipe 20 is a guide rib 24 which is positioned in a plane through the axis of the exhaust pipe. The surface of the guide rib 24 disposed toward the engine is developed so as to define seating surfaces for a pair of deflection flaps 25 and 26 which are adjacently positioned on opposite sides of the rib 24 and rest on the seating surfaces defined thereby. When in the seating position, the flaps 25 and 26 and the exposed surfaces of the rib 24 display a desired aerodynamic profile. Seated within the end of the guide rib 24 disposed toward the end of the exhaust orifice 35 of the nozzle 30 is a second rib 34 which extends along the axis of the exhaust pipe toward the exhaust orifice 35 of the nozzle.

A pair of actuating levers 27 are provided. One end of each of the actuating levers 27 is secured to each of the deflection flaps 25 and 26 adjacent the guide rib 24. The remaining ends of the levers 27 are secured to the nacelle of the aircraft. The ends of the deflection flaps 25 and 26 most proximate the engine are rotatably secured to a common shaft 28 which is supported at its ends in guide rails (not shown). A plurality of axial deflection rods 33 extend through an opening 29 in the rib 24. One end of each of the deflection rods 33 is rigidly anchored to the rib 34 which, as previously mentioned, is mounted in the nozzle 30. The remaining end of each of the rods 33 is engaged with the shaft 28 to which the deflection flaps 25 and 26 are rotatably secured.

During deceleration of the aircraft, the nozzle 30 is axially positioned outwardly from the nacelle 12 by means of the actuating means 15 which are caused to extend. The extended position of the nozzle is illustrated in phantom in FIGS. 1 and 2. This movement of the nozzle causes the rib 34 mounted thereon to move outwardly with the nozzle thereby carrying with it the shaft 28. Since the guide rib 24 is secured to the exhaust pipe of the aircraft, the deflection flaps 25 and 26 are cammed outwardly by the surfaces of the rib 24. The extensional movement of the nozzle 30 causes the levers 27 to swing the deflection flaps 25 and 26 outwardly from their rest position to the extended position illustrated in phantom in FIG. 1.

Prior to movement of the deflection flaps 25 and 26 from their rest position, which is substantially parallel to the axis of the jet flow, the sliding movement of the guide members 31 riding within the guide channel 23 produces a continuous smooth opening of the guide flaps 21 so as to reduce the gas pressure within the exhaust pipe and produce a deceleration counter thrust. Thus, outward axial movement of the nozzle 30 causes the deflection flaps to assume the phantom position illustrated in FIG. 1 thereby obstructing the gas flow through the nozzle and correspondingly moving the guide flaps 21 outwardly away from the exhaust pipe. The illustrated embodiment thus provides a simple and effective jet deflection means for facilitating the deceleration of a jet aircraft with the least possible number of components and with a minimum consumption of energy.

Although but one specific embodiment of the invention has been herein shown and described, it will be understood that certain details of the construction shown may be altered without departing from the spirit and scope of this invention.

I claim:

1. An apparatus particularly adapted for decelerating the jet exhaust of a jet aircraft having a nozzle positioned adjacent to and coaxial with respect to the exhaust pipe of the engine, said apparatus comprising guide flaps, deflection flaps positioned within the jet flow stream, and means for operably connecting said deflection flaps and said guide flaps to said nozzle so that upon axial movement of said nozzle with respect to the exhaust pipe, the position of each of said deflection flaps and said guide flaps is correspondingly altered as determined by the position of said nozzle.

2. An apparatus in accordance with claim 1 comprising means for moving deflection flaps along a predetermined path for positioning said deflection flaps relative to said guide flaps during axial movement of said nozzle.

3. An apparatus in accordance with claim 2 comprising a support shaft for supporting said deflection flaps, said support shaft being connected to at least one rod which is movable in an axial direction with respect to the exhaust pipe.

4. An apparatus in accordance with claim 3 including a first guide rib extending generally parallel to the direction of normal jet flow and being rigidly secured to the exhaust pipe of the aircraft and wherein one end of said rod is positioned for slidable movement through said guide rib.

5. An apparatus in accordance with claim 4 which further includes a second rib secured to said nozzle, said rod being secured to said second rib so that upon axial movement of said nozzle, the deflection flaps will be cammed against the surface of said guide rib so as to cause deflection of the jet flow stream through the nozzle.

References Cited

UNITED STATES PATENTS 3,036,431   5/1962   Vdolek _____ 239—265.31

FOREIGN PATENTS 236,848   10/1961   Australia.

M. HENSON WOOD, JR., Primary Examiner

M. Y. MAR, Assistant Examiner

U.S. Cl. X.R.

239—265.37